Patented Dec. 26, 1922.

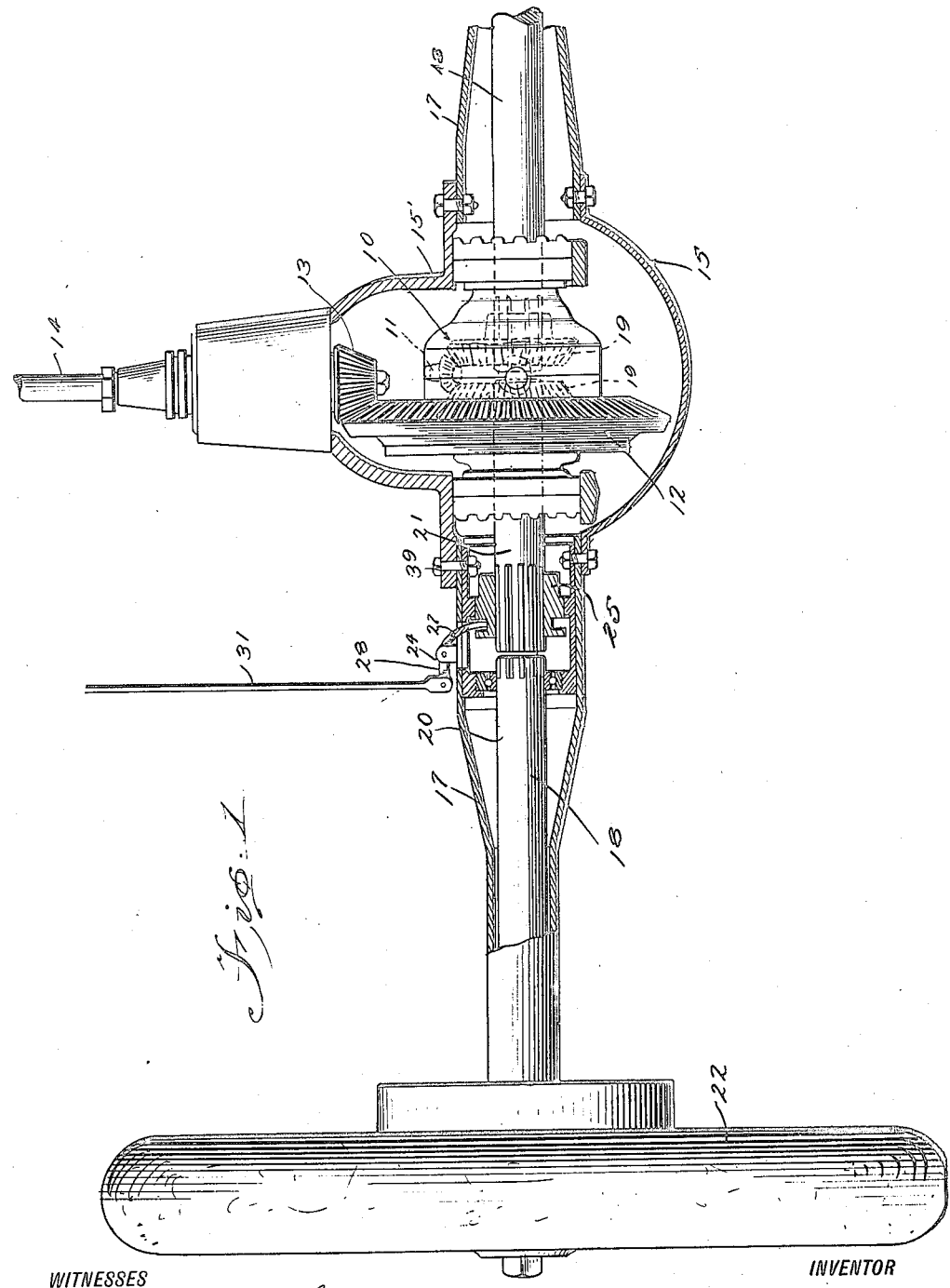

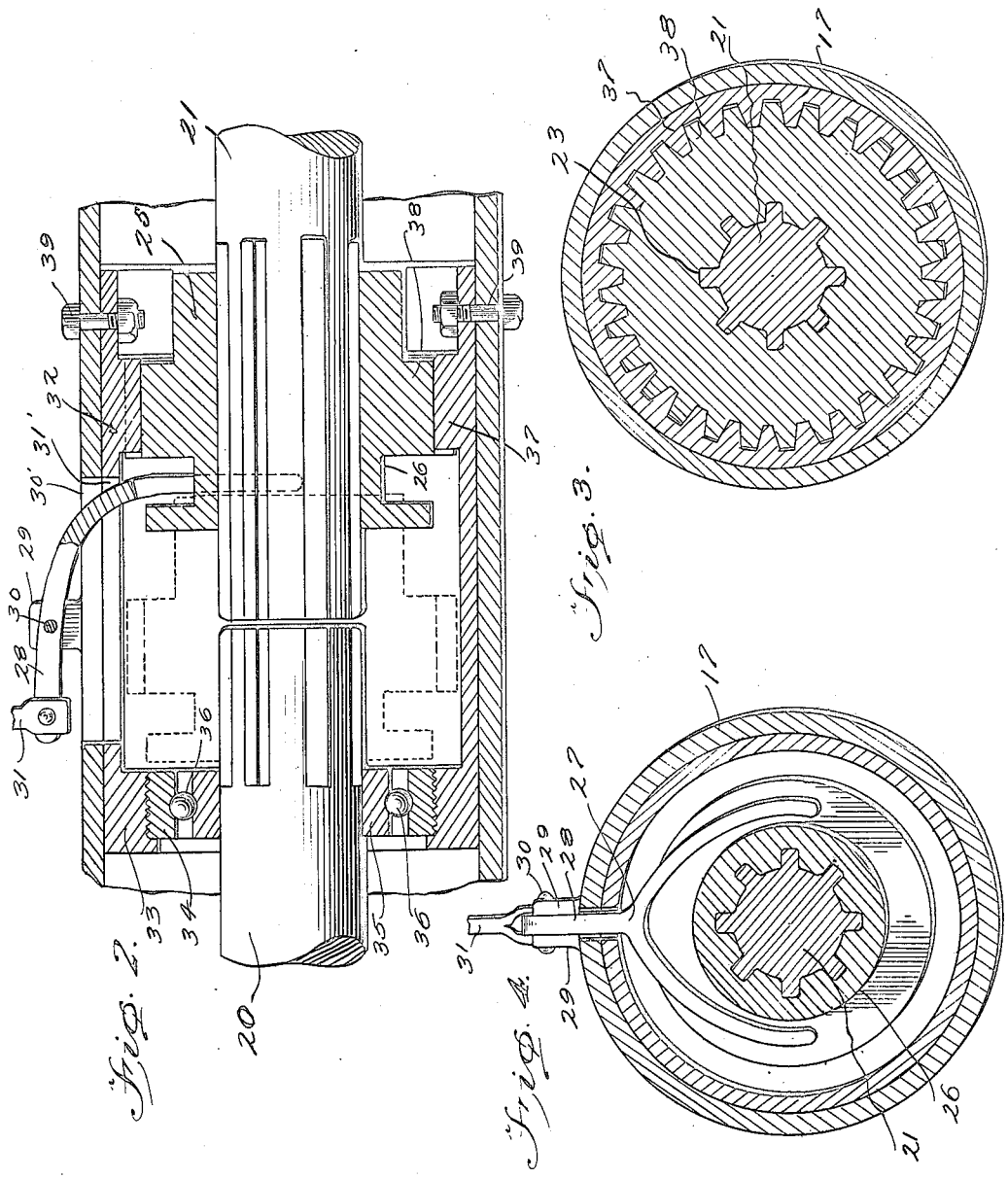

1,440,341

UNITED STATES PATENT OFFICE.

CLARENCE C. CRISPEN, OF HARRISBURG, PENNSYLVANIA.

DIFFERENTIAL.

Application filed November 17, 1921. Serial No. 515,776.

*To all whom it may concern:*

Be it known that I, CLARENCE C. CRISPEN, a citizen of the United States, and a resident of Harrisburg, in the county of Dauphin and State of Pennsylvania, have invented certain new and useful Improvements in Differentials, of which the following is a specification.

This invention relates to a differential and more particularly to means for changing the driving speed thereof.

The present invention is particularly adapted for motor vehicles and has for its object to provide means whereby a differential associated with the driving axle of the motor vehicle may be caused to operate for driving one wheel at twice the speed it would be driven when the differential is operating normally, and at the same time disconnect the other wheel from the differential so that it may freely revolve.

It is also an important object of the invention that the operating means referred to may be operable from a remote point, that is, from the driving seat of the motor vehicle with which the invention may be associated.

Other objects will hereinafter appear.

It is a well known fact that if one driving wheel of an automobile is raised and the other one left on the ground, the wheel that is free will be driven twice the speed of the constructed gear ratio.

With the above in mind it is contemplated to divide one driving spindle or axle which extends between the differential and a drive wheel and provide means whereby the portion of the divided spindle connected with the differential may be locked against rotating, and also means whereby the two portions of the divided spindle may be connected together when desired.

The invention is illustrated by way of example in the accompanying drawings, in which:—

Figure 1 is a sectional plan view illustrating the application of the present invention when associated with the driving spindles or axles and differential of an automobile.

Figure 2 is a vertical sectional view of a portion of the divided spindle and associated housing and further illustrating the application of the present invention.

Figures 3 and 4 are transverse sectional views taken substantially on the lines 3—3 and 4—4 respectively of Figure 1.

Referring to the drawings more particularly, 10 indicates generally a differential gear casing which carries the usual pinions 11 and the ring gear 12 which is with the driving pinion 13 carried by the drive shaft 14. The differential gear casing 10 is rotatably supported by the housing sections 15 and 15′, in the usual manner, that is, with ball bearings as shown, and from the housing 15 there extends the usual axle or spindle housing 17. Within each spindle housing there is disposed a spindle 18 which carries a drive wheel on its outer end and its inner end carrying a bevelled gear 19 adapted to continuously mesh with the associated pinion 11. It is thought that the operation of the present differential may be clearly understood and that further detailed description thereof will be unnecessary.

It may be noted that while I have shown a particular type or construction of differential it is to be understood that the application of my invention is not to be so limited in that the same advantages may be had with other forms of differentials.

In carrying out the present invention one of the spindles 18 is divided forming the two sections 20 and 21, the section 20 being connected with the wheel 22, while the section 21 carries at its inner end the bevelled gear 19. Upon the outer end portion of the section 21 there is provided the ribs 23 which extend longitudinally thereof and circumferentially spaced as shown. Also an end portion of the opposing end of the section 21 is provided with similar ribs 24. Upon the section 21 there is slidably mounted a shifter sleeve 25 which has its inner periphery suitably grooved for receiving the ribs 23 and which may also engage with the ribs 24 of the spindle section 20 for locking the two spindle sections together.

The shifter is also provided with a groove 26 in which there is disposed a fork 27, said fork having an extended portion 28 which extends through the slots 30′ and 31′ extending longitudinally of the spindle housing 17 and casting 32 respectively. The extended portion 28 is fulcrumed between posts 29 by a pin 30, said posts being formed upon the associated spindle or axle housing 17. The outer end of the fork extension 28 has pivotally connected thereto the one end of a rod 31, said rod being connected with suitable means whereby the same may be operated for shifting the shifter 25 upon the spindle sections 20 and 21 from the driver's seat of the motor vehicle.

Within the enlarged inner end portion of the spindle or axle housing 17 associated with the divided spindle there is fitted a casting generally indicated by the reference numeral 32, said casting being in the form of a sleeve and having formed adjacent its one end upon its inner periphery an annular rib 33 in which there is threaded a collar 34. Also there is fitted upon the section 20 of the divided spindle a collar 35, and between the collars 34 and 35 there is interposed the ball bearings 36. Adjacent the other end of the sleeve casting 32 there is formed upon its inner periphery a ring gear 37 which is adapted to mesh with the gear 38 formed upon the shifter 25. The casting 32 is secured to the associated spindle housing 17 by bolts 39.

In the operation of present invention, when the shifter 25 is in the position shown in Figures 1 and 2 the same rigidly connects the spindle section 21 with the associated housing 17 and holds the same against inner movement. With this occurring the associated bevel gear 19 will likewise be prevented from turning which will result in the opposite bevel gear 19 of the differential being rotated twice the speed for which the differential is constructed. It is to be observed that the use of the invention is particularly valuable in case that the motor vehicle is traveling on a smooth and level road where a small amount of power is required for propelling the same. By utilizing the one wheel for driving the car at twice the speed the engine associated therewith may be operated more efficiently, that is to say, the engine might be operated at comparatively slow speed and yet securing a high rate of travel of the motor vehicle.

Whenever it is desired to connect the sections 20 and 21 of the spindle 18 together so that the differential may function in the usual manner, then the rod 31 should be manipulated for shifting the shifter 25 to a position so that the same will rigidly connect the two spindle sections 20 and 21.

While I have shown and described the preferred form of my invention, I wish it to be understood that I am aware of the fact that the construction, combination and arrangement of parts may be changed by those skilled in the art without departing from the spirit of the invention as indicated by the appended claims.

I claim:—

1. In combination, a pair of spindles, a differential for driving said spindles and one of said spindles being divided into two sections, and means operable from a remote point whereby one section may be rigidly locked against rotation.

2. In combination, a pair of spindles, a differential unit for driving said spindles and one of said spindles being divided into two sections, a shifter sleeve adapted to be shifted for connecting said sections and also for locking one of the sections against rotation, while the other is free for rotative movement.

3. In a motor vehicle, a pair of spindles, a drive wheel for each spindle, a differential unit for driving the spindles, and means whereby one drive wheel may be disconnected to rotate independently with respect to the differential unit, and the differential gear associated with said wheel locked against rotation.

4. In a motor vehicle, a pair of spindles, a drive wheel for each spindle, a differential unit for driving the spindles, and means whereby one drive wheel may be disconnected to rotate independently with respect to the differential, and the differential gear associated with said wheel simultaneously locked against rotation.

5. In a motor vehicle, a pair of spindles each carrying a driving wheel, a differential unit for rotating said spindle and one of said spindles being divided into two sections, and means whereby the section of the divided spindle associated immediately with the differential may be locked against rotation.

6. In a motor vehicle, a pair of spindles each having a drive wheel connected therewith, a differential unit for driving said spindles and one of said spindles being divided longitudinally, a shifter sleeve splined upon one of said sections of the divided spindle and adapted to be shifted for locking the two sections of the divided spindle together and also adapted to be shifted for locking the inner spindle section against rotation.

7. In a motor vehicle, a pair of driving spindles each connected with a driving wheel surrounded by a stationary housing, a differential for driving said spindles and one of said spindles being divided longitudinally, a shifter sleeve movable upon the divided sections and having a splined connection therewith whereby said sections may be rigidly connected together, and intermeshing gear teeth carried by the housing of the spindles and the shifter sleeve whereby the section of the divided spindle immediately associated with the differential may be locked against rotation.

8. In a motor vehicle, a pair of driving spindles each connected with a driving wheel surrounded by a stationary housing, a differential for driving said spindles and one of said spindles being divided longitudinally, a shifter sleeve movable upon the divided sections and having a splined connection therewith whereby said sections may be rigidly connected together, intermeshing gear teeth carried by the housing of the spindles and the shifter sleeve whereby the section of the divided spindle immediately associated with the differential may be locked against rotation, a shifter fork for shifting said shifter sleeve upon the divided spindle sections, and means whereby said shifter fork may be operated from a remote point.

9. In a motor vehicle, a pair of driving spindles, each carrying a driving wheel and each being enclosed in a tubular housing, a differential unit for driving said spindles and one of said spindles being divided, bearing means for supporting said divided spindles, a shifter sleeve carried by one of said sections of the divided spindle whereby said spindles may be rigidly connected together, and means carried by said housing and shifter sleeve whereby the spindle section immediately associated with the differential housing may be locked against rotation.

10. In a motor vehicle, a pair of driving spindles, each carrying a driving wheel and each being enclosed in a tubular housing, a differential unit for driving said spindles and one of said spindles being divided, bearing means for supporting said divided spindles, a shifter sleeve carried by one of said sections of the divided spindle whereby said spindles may be rigidly connected together, means carried by said housing and shifter sleeve whereby the spindle section immediately associated with the differential housing may be locked against rotation, and means whereby said shifter sleeve may be moved to its different position from the steering wheel of the motor vehicle.

CLARENCE C. CRISPEN.